United States Patent
Menge

[11] 3,715,922
[45] Feb. 13, 1973

[54] COLOR PYROMETER
[75] Inventor: Kurt Menge, Karlsruhe, Germany
[73] Assignee: Siemens Aktiengesellschaft, Munich, Germany
[22] Filed: Sept. 21, 1970
[21] Appl. No.: 74,098

[30] Foreign Application Priority Data
Sept. 20, 1969 Germany..................P 19 47 791.9

[52] U.S. Cl. ..........73/355 EM, 323/75 E, 323/75 H, 356/45
[51] Int. Cl..............................G01j 5/60, G05f 1/60
[58] Field of Search........73/355 R, 355 EM; 356/45; 323/75 E, 75 F, 75 H, 75 N

[56] References Cited
UNITED STATES PATENTS 2,652,743  9/1953  Morrow..................................356/45
2,302,554  11/1942  Kingsbury..................73/355 EM UX
2,565,249  8/1951  Machler..........................73/355 EM Primary Examiner—S. Clement Swisher
Assistant Examiner—Frederick Shoon
Attorney—Edwin E. Greigg

[57] ABSTRACT

A color pyrometer with two photo devices responding to different wavelengths and having output resistors connected in opposition. One resistor is controlled by a feedback voltage obtained from a differential amplifier responding to the voltage differential across the resistors to maintain the differential at 0. The controlled resistance or the feedback voltage is a measure of the ratio of received radiation intensities at the two wavelengths.

3 Claims, 2 Drawing Figures

PATENTED FEB 13 1973 3,715,922

COLOR PYROMETER

FIELD OF THE INVENTION

The invention relates to a color pyrometer responding to radiation from an object at two different wavelengths for obtaining the ratio of radiation intensities at the two wavelengths.

BACKGROUND OF THE INVENTION

It is known to provide a color pyrometer having a pair of photo-sensitive devices for measuring the radiation intensities of an object at two different wavelengths. In conventional arrangements, color filters (red, green) are inserted ahead of the photo-sensitive devices. The outputs of the latter are proportional to the radiation intensities at the two wavelengths or ranges of wavelengths. The ratio of the outputs is obtained in conventional arrangements with the aid of a compensation circuit comprising a measuring potentiometer. The position of the potentiometer tapping is then a measure of the color temperature. If the output signal is to be processed, a servo potentiometer is required. However, this arrangement for processing the measured output is relatively complex and costly if the measured value is not to be recorded but only regulated. Furthermore, there are applications of color pyrometers in which the response time of the recording device operating on the compensation principle is prohibitively long.

OBJECTS AND SUMMARY OF THE INVENTION

It is an object of the invention to provide a color pyrometer of simple construction, which does not require mechanically movable parts. A further object is to provide the measured value as a current which is independent of the load and linearly representive of the color temperature to be measured.

The invention is characterized in that the photoresponsive devices are connected in opposition, the load impedance of the device responding to the shorter wavelengths having a fixed resistance and that of the device responding to the longer wavelengths having a variable resistance, the value of which at zero value of the voltage differential across the impedances being proportional to color temperature. In accordance with a favorable embodiment, the differential voltage is applied to a differential amplifier generating a load-independent output current and the feedback voltage of which controls the variable resistance towards the balanced condition.

BRIEF DESCRIPTION OF THE DRAWING

Embodiments of the invention are represented in FIGS. 1 and 2 and will be described in the following.

DESCRIPTION OF THE EMBODIMENTS

Figure 1:
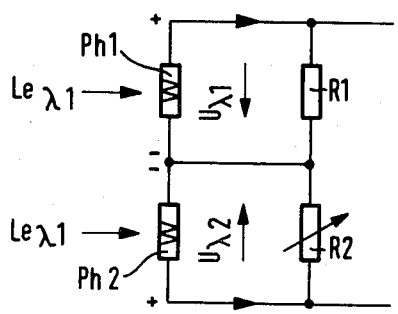
FIG. 1 is a schematic diagram explaining the principle of the invention.

As shown in FIG. 1, a pair of photo-sensitive devices Ph 1 and Ph 2 are connected in opposition to receive radiations of intensities $Le_{\lambda 1}$ and $Le_{\lambda 2}$, respectively, from an object. $\lambda 1$ and $\lambda 2$ are a pair of wavelengths or wavelength ranges which are as far apart as possible. $\lambda$ 1 being the shorter and $\lambda$ 2 the longer wavelength. The photo currents generated by the received radiation flow through load impedances R 1 and R 2 and produce voltage drops $U_{\lambda 1}$ and $U_{\lambda 2}$. If the photo-sensitive devices Ph 1 and Ph 2 are equal, variable resistor R 2 is adjusted in the initial range of measured values so as to cause $U_{\lambda 1}$ to be equal to $U_{\lambda 2}$, i.e. the voltage differential is zero. If the temperature rises, voltage $U_{\lambda 1}$ will increase more rapidly than $U_{\lambda 2}$ in accordance with Plank's Law of Radiation. The voltage differential can be reduced to zero by means of an increase of resistance R 2 and the resistance of variable resistor R 2 is then a measure of the color temperature of the object.

Figure 2:
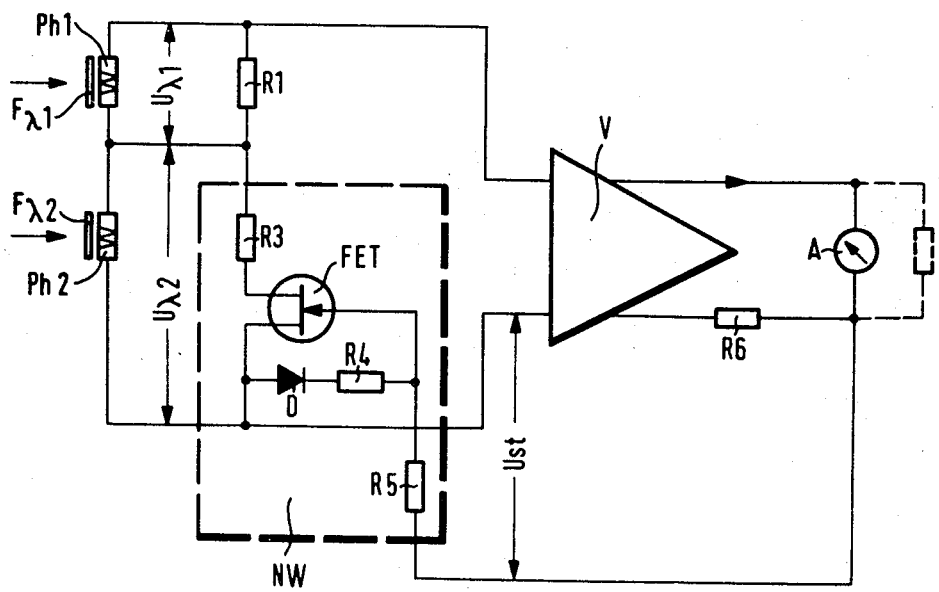
FIG. 2 is a circuit diagram of an embodiment.

FIG. 2 shows a practical circuit embodiment comprising photo-sensitive devices Ph 1 and Ph 2 in opposition. Inserted ahead of photo-sensitive devices Ph 1 and Ph 2 are optical filters $F_{\lambda 1}$ transmitting in the green range of the spectrum and $F_{\lambda 2}$ transmitting in the red range. Photosensitive device Ph 1 is connected to a load impedance R 1. Variable resistor R 2 of FIG. 1 is replaced in this embodiment by a network NW comprising a three-terminal semi-conductor device, such as a field effect transistor FET serving as a variable resistance means. The differential of voltages $U_{\lambda 1}$ and $U_{\lambda 2}$ is applied to a differential amplifier V yielding a load-independent output current. The voltage drop Ust across a feedback resistor R 6 of the amplifier, through which the output current flows, is applied to network NW and controls transistor FET so as to increase the variable output impedance until $U_{\lambda 2}$ is equal to $U_{\lambda 1}$. The output current of amplifier V is then a measure of the ratio between voltages $U_{\lambda 1}$ and $U_{\lambda 2}$ and, thus, a measure of the color temperature. The variation in the resistance of transistor FET between the drain and source electrodes is exponential in character. By means of a potentiometer comprising resistors R 4 and R 5 and a diode D, the exponential relation is modified so as to make the resistance variation linearly dependent on the control voltage Ust. A resistor R 3 determines the zero point of the scale and the range of measurement. With the FIG. 2 circuit, it is possible through a suitable distribution of the spectral sensitivity of the photosensitive devices and of the optical filters as well as by suitable design of the resistive network to obtain from the amplifier an output current which is linearly dependent on color temperature and makes possible a linear scale representation on an indicating instrument A or, as shown in dash lines, to produce across a resistor connected in parallel therewith a voltage proportional to color temperature, which can be used for regulating and control purposes.

The temperature of amplifier V, transistor FET and diode D may be thermostatically maintained to counteract any temperature dependence of the measuring circuit. The electronic elements can be integrated with the radiation response devices to form a compact pyrometer, which may be located at the measuring point and the output signal of which may be translated to a distant utilizing device via conductors without disturbances.

What is claimed is:

1. In a color pyrometer for measuring the color temperature-proportional ratio of the radiation intensities of an object at a shorter wavelength and at a longer wavelength, the improvement comprising A. a first photosensitive device responsive to the shorter wavelength,
B. a fixed resistance forming the load impedance of said first photosensitive device,
C. a second photosensitive device connected in opposition to said first photosensitive device and responsive to the longer wavelength,
D. a variable resistance means comprising a three-terminal semi-conductor device forming the load impedance of said second photosensitive device,
E. a differential amplifier connected to said load impedances for receiving the differential of the voltage drops across said load impedances and
F. means for applying a negative feedback voltage from said amplifier to said variable resistance means for varying the load impedance of said second photosensitive device to obtain a zero value of said differential; the magnitude of resistance of said variable resistance means at zero differential being proportional to the color temperature.

2. An improvement as defined in claim 1, wherein said variable resistance means is a field effect transistor.

3. An improvement as defined in claim 2, including means connected to said field effect transistor for linearizing the exponential resistance characteristic thereof.

* * * * *